United States Patent
O'Connor et al.

(10) Patent No.: US 7,711,630 B2
(45) Date of Patent: May 4, 2010

(54) SYSTEM AND METHOD FOR TRADING MULTIPLE TRADEABLE OBJECTS USING A SINGLE TRADING INTERFACE

(75) Inventors: Gerald J. O'Connor, Chicago, IL (US); Stephen J. Murphy, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 973 days.

(21) Appl. No.: 11/146,167

(22) Filed: Jun. 6, 2005

(65) Prior Publication Data

US 2006/0277136 A1 Dec. 7, 2006

(51) Int. Cl.
*G06Q 40/00* (2006.01)
(52) U.S. Cl. .......................... 705/37; 705/35
(58) Field of Classification Search .............. 705/35–45
See application file for complete search history.

(56) References Cited

U.S. PATENT DOCUMENTS

| | | | |
|---|---|---|---|
| 5,787,402 A | | 7/1998 | Potter et al. |
| 6,052,673 A * | | 4/2000 | Leon et al. .................... 705/38 |
| 6,484,149 B1 | | 11/2002 | Jammes et al. |
| 6,691,094 B1 | | 2/2004 | Herschkorn |
| 7,212,999 B2 | | 5/2007 | Friesen et al. |
| 7,389,268 B1 | | 6/2008 | Kemp, II et al. |
| 2002/0120551 A1* | | 8/2002 | Jones, III .................... 705/37 |
| 2003/0004853 A1* | | 1/2003 | Ram et al. .................... 705/37 |
| 2003/0097325 A1 | | 5/2003 | Friesen et al. |
| 2004/0117292 A1* | | 6/2004 | Brumfield et al. ............. 705/37 |
| 2005/0057434 A1 | | 3/2005 | Youn |
| 2005/0060665 A1 | | 3/2005 | Rekimoto |
| 2006/0259383 A1 | | 11/2006 | Kemp, II et al. |
| 2007/0271171 A1* | | 11/2007 | Lutnick et al. ................. 705/37 |

OTHER PUBLICATIONS

HowStuffWorks "What is a computer algorithm?" http://computer.howstuffworks.com/question717.htm.*
HowStuffworks "What is a computer algorithm?" http://computer.howstuffworks.com/question717.htm, unknown publication date.*
International Search Report for PCT/US06/21533.

* cited by examiner

*Primary Examiner*—James Kramer
*Assistant Examiner*—Rajesh Khattar
(74) *Attorney, Agent, or Firm*—McDonnell Boehnen Hulbert & Berghoff LLP

(57) ABSTRACT

A system and method are provided for displaying information related to a plurality of tradeable objects using a single graphical interface. One example graphical interface includes at least two screen regions displayed in relation to each other, with each region including a plurality of locations. Each location in the first screen region corresponds to a value along a first value axis, and each location in the second screen region corresponds to a value along a second value axis. The graphical interface also includes a first indicator in the first region and a second indicator in the second region. In response to a repositioning command based on an algorithm, the graphical interface includes a repositioned first value axis and the second value axis, such that the indicators are displayed in new locations determined based on the algorithm.

25 Claims, 6 Drawing Sheets

| | | | | | | | |
|---|---|---|---|---|---|---|---|
| CME GE | 9852.5 | 9853.0 | 9853.5 | 9854.0 | 9854.5 | 9855.0 | 9855.5 |
| Mar05 | 83 | 633 | 187 | 250 | 20 | 98 | 43 |
| CME GE | 9840.0 | 9841.0 | 9841.5 | 9842.0 | 9842.5 | 9843.0 | 9843.5 |
| Jun05 | 35 | 45 | 56 | 32 | 134 | 56 | 12 |
| CME GE | 9838.0 | 9839.0 | 9839.5 | 9840.0 | 9840.5 | 9841.0 | 9841.5 |
| Sep05 | 834 | 235 | 34 | 21 | 56 | 45 | 89 |
| CME GE | 9830.5 | 9831.0 | 9831.5 | 9832.0 | 9832.5 | 9833.0 | 9833.5 |
| Dec05 | 89 | 58 | 223 | 645 | 57 | 145 | 57 |
| CME GE | 9834.5 | 9835.0 | 9835.5 | 9840.0 | 9840.5 | 9841.0 | 9841.5 |
| Mar06 | 511 | 455 | 56 | 22 | 11 | 89 | 85 |
| CME GE | 7.5 | 9838.5 | 9839.0 | 9839.5 | 9840.0 | 9840.5 | 9841.5 |
| Jun06 | 35 | 785 | 345 | 134 | 45 | 11 | 158 |
| CME GE | 39.5 | 9840.5 | 9841.0 | 9841.5 | 9842.0 | 9842.5 | 9843.0 |
| Sep06 | 56 | 115 | 255 | 11 | 55 | 125 | 47 |
| CME GE | 9841.0 | 9841.5 | 9842.0 | 9842.5 | 9843.0 | 9843.5 | 9844.0 |
| Dec06 | 11 | 89 | 55 | 645 | 681 | 58 | 187 |
| CME GE | .5 | 9843.0 | 9843.5 | 9844.0 | 9844.5 | 9845.0 | 9846.0 |
| Mar07 | 55 | 45 | 56 | 120 | 139 | 156 | 27 |
| CME GE | 841.5 | 9842.0 | 9843.5 | 9844.5 | 9845.0 | 9845.5 | 9846.0 |
| Jun07 | 234 | 54 | 78 | 56 | 681 | 681 | 54 |
| CME GE | 9843.0 | 9845.0 | 9845.5 | 9846.0 | 9846.5 | 9847.0 | 9846.5 |
| Sep07 | 15 | 85 | 456 | 834 | 56 | 234 | 681 |
| CME GE | 844.5 | 9845.5 | 9846.0 | 9846.5 | 9847.0 | 9847.5 | 9848.0 |
| Dec07 | 88 | 98 | 674 | 567 | 46 | 89 | 63 |
| CME GE | 5.0 | 9848.0 | 9848.5 | 9849.0 | 9847.5 | 9848.0 | 9848.0 |
| Mar08 | 90 | 454 | 234 | 54 | 455 | 223 | 14 |
| CME GE | 5 | 9847.0 | 9848.0 | 9848.5 | 9849.0 | 9850.5 | 9851.5 |
| Jun08 | 2 | 86 | 234 | 24 | 78 | 56 | 645 |
| CME GE | 5 | 9847.0 | 9848.0 | 9848.5 | 8949.0 | 9849.5 | 9850.5 |
| Sep08 | 3 | 11 | 11 | 11 | 12 | 25 | 45 |
| CME GE | | 9849.0 | 9849.5 | 9850.0 | 9850.5 | 9851.0 | 9851.5 |
| Dec08 | 11 | 89 | 47 | 57 | 147 | 11 | 22 |

SYSTEM AND METHOD FOR TRADING MULTIPLE TRADEABLE OBJECTS USING A SINGLE TRADING INTERFACE

TECHNICAL FIELD

The present invention relates generally to the electronic trading. More specifically, it relates to a system and method for enabling traders to trade multiple tradeable objects in an electronic trading environment.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may connect to an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Client entities, such as computers being used by traders to trade, are typically connected to an electronic exchange by way of a communication link to facilitate electronic messaging between the trading entities and the exchange. The messaging may include market information that is distributed from the electronic exchange to traders, as well as orders, quotes, acknowledgements, fills, cancels, deletes, cancel and replace, and other well-known financial transaction messages. Although the amount or type of market information published by an electronic exchange often differs, there are typically some standard pieces of information. For instance, market information usually includes the inside market, which generally includes the current lowest sell price (often referred to as the best ask) and the current highest buy price (often referred to as the best bid). Market information may also include market depth, which generally refers to quantities available in the market at the price levels other than those corresponding to the inside market. In addition to providing order book information including price and quantity information, electronic exchanges can offer other types of market data such as the open price, settlement price, net change, volume, last traded price, last traded quantity, and order fill information.

Once a trader at the client entity receives the market information, it may be displayed on the trading screen. Upon viewing the market information, traders can take certain actions including the actions of sending buy or sell orders to the electronic market, adjusting existing orders, deleting orders, or otherwise managing orders. Traders may also use software tools to automate these and additional actions.

To profit in today's rapidly moving markets, traders must be able to react quickly and assimilate enormous amounts of data. For example, a trader may constantly have to review market data, world news, business news, and so on before making trades. Consequently, a skilled trader with the quickest software, the fastest communications, and the most sophisticated analysis can significantly improve the trader's own or the trader's firm's potential profits. The slightest advantage in speed or ability to assimilate or analyze the information can generate significant returns in the fast moving markets. Therefore, in today's fast and dynamically changing markets, a trader lacking those means may be at a disadvantage compared to other traders.

For certain trading strategies, traders may be interested in monitoring and participating in markets of two or more tradeable objects. Known trading applications have limited capabilities to address this interest. For example, market information for one tradeable object may be displayed in a trading interface in a first trading window and information related to a second tradeable object may be displayed in a second trading window. A disadvantage of such trading applications is that the trader who is interested in trading two or more tradeable objects at the same time must use his valuable time to try to discern the current relationship between the tradeable objects. Order entry is also complicated by the multiple windows.

It would therefore be desirable to have an improved apparatus, method, and interface for enabling traders to trade multiple tradeable objects.

BRIEF DESCRIPTION OF THE DRAWINGS

Example embodiments of the present invention are described herein with reference to the following drawings, in which:

FIG. 5 is a block diagram illustrating a centered market grid of FIG. 3 according to one example embodiment; and FIG. 6 is a block diagram illustrating a repositioned market grid of FIG. 3 according to another example embodiment.

DETAILED DESCRIPTION

I. Overview

Figure 1:
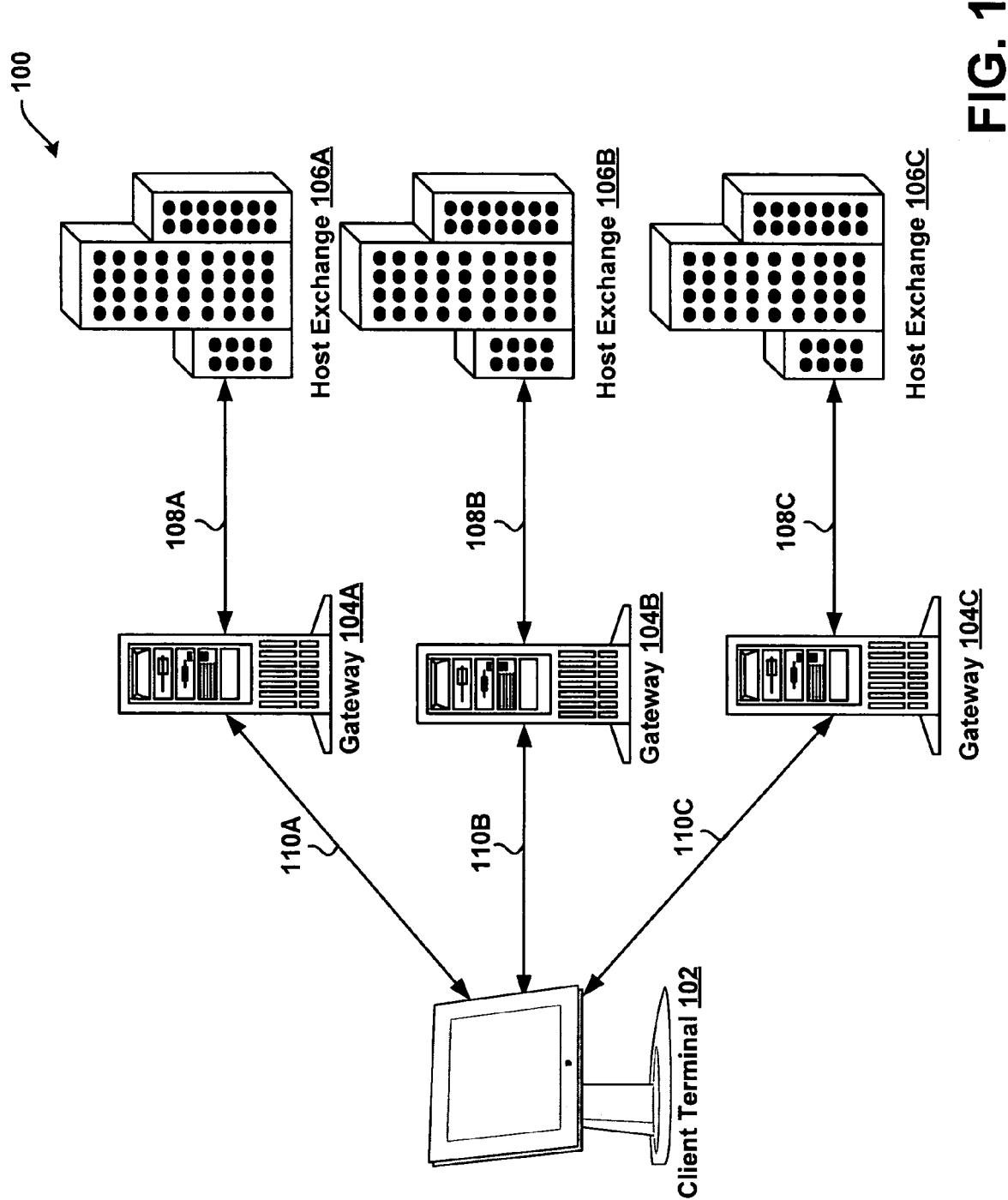
FIG. 1 is a block diagram illustrating an example network configuration for a communication system utilized to access one or more exchanges.

Trading tools are provided that allow a trader to view market data and trade a plurality of tradeable objects using a single graphical interface. One example graphical interface includes at least two screen regions displayed in relation to each other. In one embodiment, the first screen region includes a first plurality of locations, and the second screen region includes a second plurality of locations. Each location of the first plurality of locations corresponds to a value along a first value axis, and the first screen region is associated with at least a portion of the first value axis. Similarly, each location of the second plurality of locations corresponds to a value along a second value axis, and the second screen region is associated with at least a portion of the second value axis.

The example graphical interface also includes a first indicator displayed in one of the plurality of locations in the first screen region, and a second indictor displayed in one of the plurality of location in the second screen region. The first and second indicators can be associated with inside markets of the first and second tradeable objects, respectively. For example, the indicators can represent the best bid, the best ask, or the last traded price corresponding to the tradeable objects; however, the indicators could represent different parameters as well.

According to one example embodiment, the graphical interface could be programmed to reposition the displayed data upon detecting a command that can be based on an algorithm. In response to a repositioning command, the graphical interface displays a repositioned first value axis such that the first indicator is displayed in a new first location based on the algorithm in the first screen region. Similarly, upon receiving the repositioning command, the second value axis is repositioned as well such that the second indicator is displayed in a new second location based on the algorithm in the second screen region.

The graphical user interface also provides means for order entry. According to one example embodiment, selection of a location in the first plurality of locations in the first screen region initiates placement of a trade order to buy or sell the first tradeable object. Similarly, selection of a location in the second plurality of locations in the second screen region initiates placement of a trade order to buy or sell the second tradeable object. According to one example embodiment, the locations in the first and second screen regions could be selected using a user input device. Upon receiving the selections of specific locations in the first and second screen regions, the graphical user interface may display working order indicators in the selected locations of the first and second screen regions. The order parameters, at least in part, can be determined based on the selected location. For example, the selected location can be used to determine an order price, while an order quantity can be based on a default order quantity defined for a tradeable object. According to one example embodiment, the indicators can be moved between the regions, and the movement of a working order indicator, depending on the set-up, may initiate cancellation of the order in the first screen region and placement of another order in the second region. In such an embodiment, when the indicator movement is completed, a working order indicator may be displayed in the second screen region. Alternatively, even when the indicator is moved from the first screen region, the first order may be left pending, while the second order is placed. In such an embodiment, two working order indicators, one in the first screen region and the second in the second screen region may be displayed. Also, when the working order indicator is moved from the first screen region to the second screen region, an order quantity for the second order can be determined based on a predefined algorithm, such as an equation.

According to another example embodiment, selection of a location in a single screen region may initiate placement of orders for not only a tradeable object associated with the screen region, but also for other tradeable objects. Such order placement could be controlled by a user-defined algorithm that determines at least order prices and order quantities for all orders to be placed in relation to a plurality of tradeable objects.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when a trader selects a tradeable object, the trader may access market data related to the selected tradeable object(s). Referring to FIG. 1, an example communication that might occur between an electronic exchange and a client terminal in accordance with the example embodiments is shown. During a trading session, market data, in the form of messages, may be relayed from matching processes at exchanges 106A-106C over communication links 108A-C and 110A-C to a client terminal generally indicated as 102. It should be understood that an exchange could have one or more matching processes. As illustrated in FIG. 1, intermediate devices, such as gateway(s) 104A-C, may be used to facilitate communications between the client terminal 102 and the host exchanges 106A-C. It should be understood that while FIG. 1 illustrates each host exchange 106A-106C communicating with the client terminal 102 via a separate gateway, a single gateway could be used to provide communication between the client terminal 102 and multiple exchanges. Alternatively, multiple gateways could be assigned to each electronic exchange.

The market data provided by an exchange may contain information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as a total traded quantity value for each price level, an opening price, a last traded price, a last traded quantity value, a closing price, or order fill information. It should be understood that market information provided from an electronic exchange could include more or fewer items depending on the type of tradeable object or the type of exchange. Also, it should be understood that the messages provided in the market data may vary in size depending on the content carried by them, and the software at the receiving end may be programmed to understand the messages and to act out certain operations.

A trader may view the information provided from an exchange via one or more specialized trading screens created by software running on the client terminal 102, the embodiments of which will be described in relation to subsequent sections. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken and send them to a respective exchange. It should be understood that different types of messages or order types can be submitted to the host exchanges 106A-C, all of which may be considered various types of transaction information. Once generated, user action messages may be sent from the client terminal 102 to the host exchange(s) over communication links 110A-C and 108A-C.

III. System Function and Operation

Figure 2:
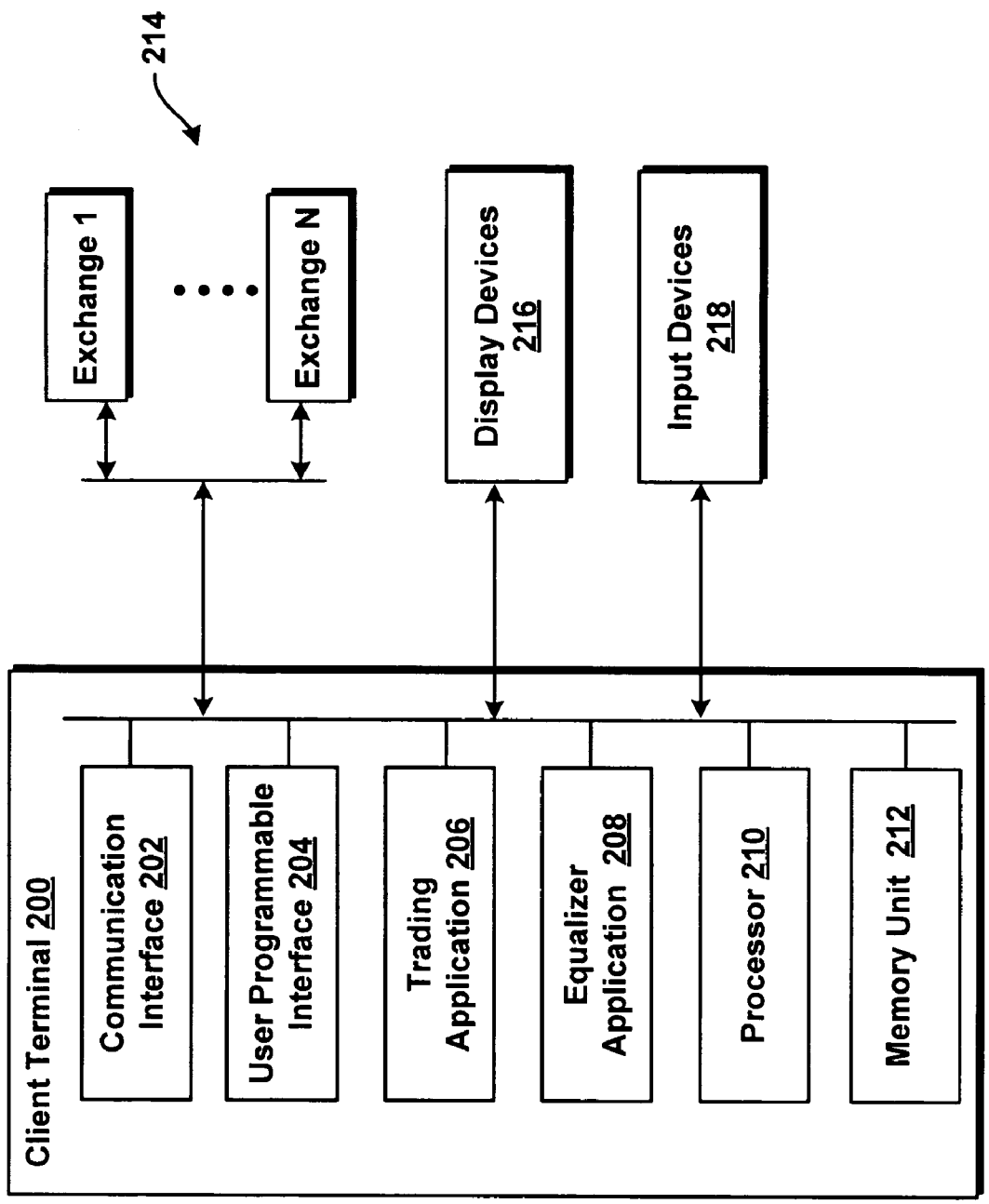
FIG. 2 is a block diagram illustrating a client terminal with a number of layers defining different stages that may be used to implement the example embodiments described herein.

FIG. 2 is a block diagram illustrating a client terminal 200 with a number of layers defining different stages that may be used to implement various example embodiments that will be described in greater detail below. The layers include a communication interface 202, a user programmable interface 204, a trading application 206, an equalizer application 208, a processor 210, and a memory unit 212.

The example client terminal 200 can include any type of computing device, such as a personal computer, laptop computer, hand-held computer, or other devices that have network access. The communication interface 202 allows the client terminal 200 to interact with the trader and to generate contents and characteristics of a trade order to be sent to one or more of a plurality of electronic exchanges 214. In one example embodiment, the user programmable interface 204 allows a user to enter any configuration parameters to be used by the equalizer application 208 or the trading application 206. The user programmable interface 204 may include any type of interface. For example, the user programmable interface 204 may be a command-driven interface, a graphical user interface that takes advantage of computer graphics, or the combination thereof. The graphical user interface may include one or more windows that can be moved around the display screen, and their size and shape can be changed as the user wishes. A window may in turn include icons that represent commands, files, or more windows. Alternatively, rather than using a user programmable interface at the client terminal, an intelligent communication interface could be used instead. In such an embodiment, a third party application could input one or more variables into the trading application 206 and the equalizer application 208, and the applications could operate based on those variables. The types of variables and functions will be described in greater detail below.

In one embodiment, the user programmable interface 204 can be implemented in a software module or processor. The user programmable interface 204 can be a routine, a data structure, or the combination thereof, stored in the memory unit 212, and may perform the functions of the user programmable interface described herein.

As mentioned in an earlier paragraph, the user programmable interface 204 may take a format of different windows, which may be displayed via the display devices 212 of the client terminal 200, such as a screen of the client terminal 200. The windows can include as many functional icons as the user requests, and each icon may include an image displayed on the screen to represent an element that can be manipulated by the user.

Information being provided by the trading application 206 may be displayed to a trader via display devices 216, and may allow a trader to view market data, enter, cancel, change, and view trade orders. Preferably, the trading application 206 has access to market information from the host exchanges 214, and allows a trader to view market data, enter, change, and cancel orders, and view order related information. A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments is not limited by the type of terminal or device used.

Portions of X_TRADER® and the MD Trader™-style display are described in U.S. Pat. No. 6,772,132, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

In the embodiment illustrated in FIG. 2, the trading application 206 and the equalizer application 208 are shown as two separate software applications. However, it should be understood that the functionality of both applications could be combined into a single software application as well. In one example embodiment, the equalizer application 208 allows a trader to view market data and enter orders for multiple tradeable objects in one window of a graphical user interface.

According to one example embodiment, the tradeable objects that a trader selects for display via the graphical user interface can be related to each other so that the trader's ability to view the grouped market information corresponding to such tradeable objects can be potentially beneficial. For example, the trader could view a relative movement of the market in relation to each tradeable object, and make trading decision based on the movements. The example embodiments of graphical interfaces described below will use examples related to trading short term interest rate products ("STIRs"), or STIR futures. STIRs are derivative products that derive from the underlying cash markets. STIR futures are agreements to buy or sell short-term interest rates at an agreed price for cash settlement on a future date. For example, the STIR futures currently traded on the CME exchange are Eurodollar future based on the 3-month London Interbank Offered Rate ("LIBOR") on U.S. dollar deposits, Euroyen future based on the 3-month Tokyo Interbank Offered Rate ("TIBOR") on Japanese yen deposits, and many others.

Typically, the STIR futures contracts trade for quarterly contract months of March, June, September, and December. However, some STIR futures could be traded for different calendar months as well. Since underlying products of STIRs are interest rates, buying a STIR future can be thought of as lending at the corresponding interest rate. Similarly, selling a STIR future is comparable to borrowing at that equivalent interest rate. However, it should be understood that the example embodiments are not limited to any specific tradeable object.

Many exchanges, in addition to allowing a trader to submit orders in individual contract months, commonly referred to as "outrights," also enable traders to submit orders for a trading strategy. For example, a trading strategy may encompass a number of outright months corresponding to the tradable object, and an exchange could provide market data corresponding to the trading strategy for display to a trader via a graphical user interface at a client terminal.

Common trading strategies that are available for trading STIRs and STIR futures often include strips, packs, and bundles. A strip trade is a trade where consecutively quarterly traded months of the same tradeable objects, typically future products, such as for example, Eurodollar STIR futures, are bought or sold simultaneously. When a trader uses a strip, the trader may attempt to lock up a yield for a time period equal to the length of the strip. For example, if a strip is created for four consecutive months of Eurodollar STIR futures, the strip would lock-up a one year rate. However, it should be understood that a strip could include non-consecutive months as well, such as March05, March06, March07, and March08. Also, a strip is not limited to having four tradeable objects, and more or fewer tradeable objects could be included in a strip as well. If a strip is created for eight successive months of Eurodollar STIR futures, it will lock up a two year rate. Buying a strip constitutes buying all months in the strip. Traders often use packs as an alternative method for executing a strip trade.

A pack is buying or selling four consecutive quarterly months within a designated color code that corresponds to their position on the yield curve. Packs are often considered spread trades, because any price consistent with the agreed upon average net change for the pack may be assigned to the individual trades. While the average net change is often used for a pack price, the prices corresponding to all tradeable objects in the pack could be summed up to determine a pack price. The number of packs that is provided to a trader may be exchange-based; however, commonly provided packs include white, red, green, blue, and gold packs, corresponding to Eurodollar futures years 1-5, respectively. For example, the first month of the white pack is the first quarterly month, and the first month of the red pack is the fifth quarterly month. Finally, a bundle is sale or purchase consisting of a strip of two or more complete years of delivery. For example, a two-year bundle may consist of the first eight Eurodollar STIR futures. Similarly to a pack price, a bundle price could correspond to either an average price determined based on prices of tradeable objects in the bundle, or a sum of prices corresponding to the tradeable object. It should be understood that the pack price or the bundle price could be determined using different methods as well.

As mentioned in earlier paragraphs, while the example graphical interfaces will be described in relation to STIR products, the example embodiments are not limited to any specific tradeable objects and could be equally applicable in relation to different tradeable objects as well.

IV. Graphical User Interface

Figure 3:
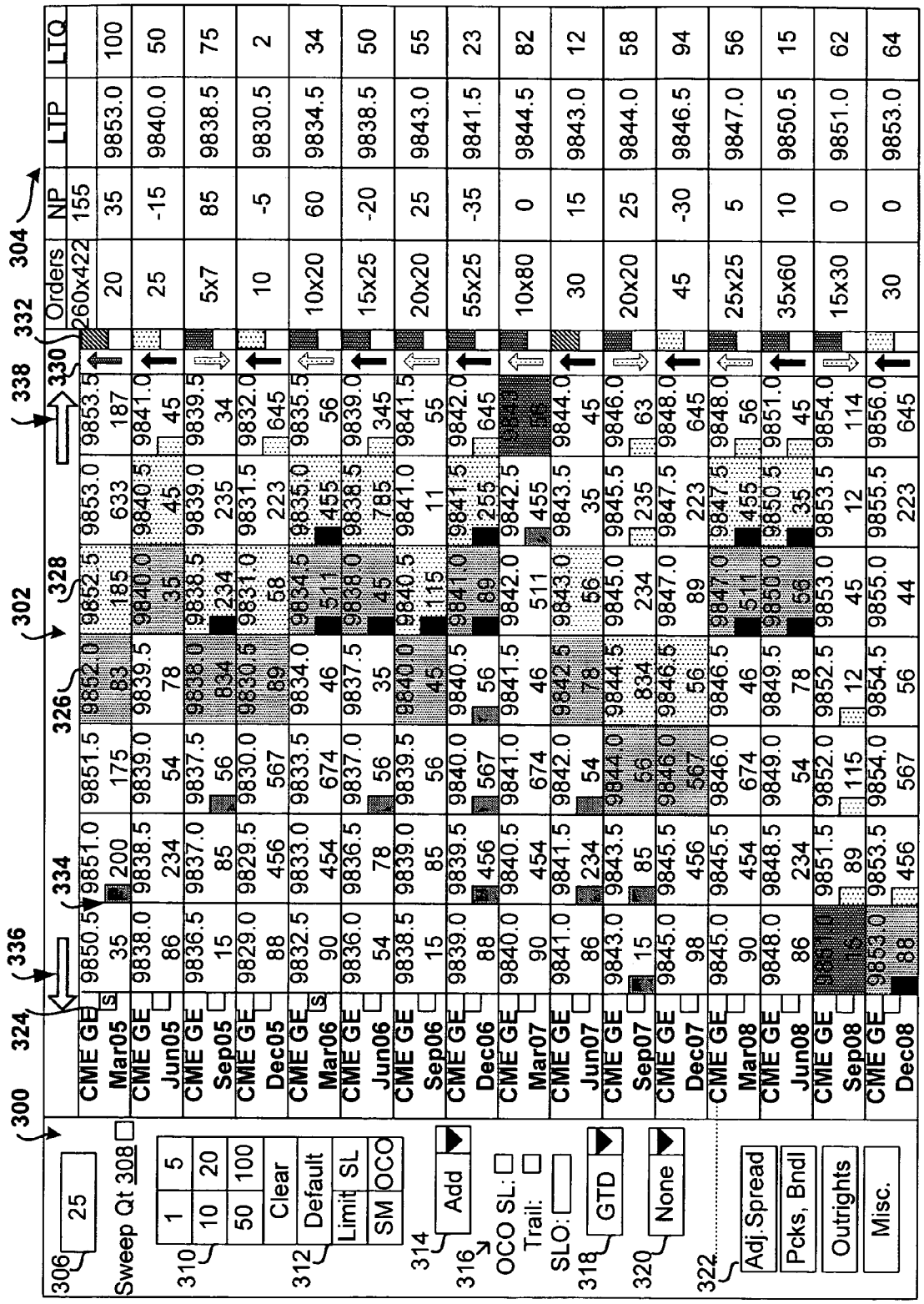
FIG. 3 is a block diagram illustrating an example embodiment of a graphical interface that can be used for displaying market data related to a plurality of tradeable object and placing orders in relation to the displayed market data.

FIG. 3 is a block diagram illustrating an example embodiment of a graphical interface that can be used for displaying market data related to a plurality of tradeable object and placing orders in relation to the displayed tradeable object. The graphical interface includes an order parameter setting area 300, a market depth/order entry area 302, also referred hereinafter as a market grid, and an order related data area 304.

The order parameter setting area 300 includes a number of fields and icons that can be selected by a trader to define order related parameters. As illustrated in FIG. 3, the order parameter setting area 300 include a number of icons that can be used by a trader to define order parameters, order types, as well as other parameters that will be described in greater detail below.

The order parameter setting area 300 includes a default quantity field 306 that can be used to define a default order quantity to be used in relation to any order entered via the market grid 302. It should be understood that more than one default quantity field could be provided as well, and the quantity value that will be applied to a newly entered order may depend on how an order is entered via the market grid 302. For example, and as will be described in greater detail below, a trader could enter an order by clicking on one of the market grid cells corresponding to a price of a tradeable object that the trader wants to trade. If a user selects a market grid cell using a mouse, two different default quantity values could be defined so that a right click would correspond to one default quantity, and a left click would correspond to a second default quantity. Different embodiments, depending on the input device, could be used as well. It should be understood that a trader could pre-configure a maximum quantity that could be used as a control mechanism to limit a trader's attempt to submit any higher order quantity.

In addition to setting default quantities, a trader could select a sweep quantity selection box 308 to apply a sweep quantity to any entered order. When the sweep quantity box 308 is checked, an order will be placed for the market quantity from the price/quantity clicked. For example, if the sweep quantity box 308 is checked, and a trader places a buy order at the best ask price, the order quantity will be set to the quantity available at the current best ask price. Similarly, if a buy order is placed at a price one tick away from the best ask price, then the order quantity will be set to the sum of the quantity available at the selected price and the quantity available at the best ask price.

The quantity pad 310 can be used by a trader to define a quantity values for an order. The quantity pad 310 provides six quantity values, including a quantity of 1, 5, 10, 20, 50, and 100. Rather than using a current default quantity 306, a trader can use the quantity pad 310 to change the quantity value that will be used in relation to the next order. It should be understood that the quantities displayed in the quantity pad are only examples, and a trader could change the values of these quantities to some other values. To do that, for example, the trader could right-click on a number and then enter a desired number. Also, a trader can select different modes that can be used to control the operation of the quantity pad. One such option, an "Add" mode, is shown in relation to an icon 312. When the "Add" mode is selected, the quantities selected by a trader on the quantity pad will be added and used as an order quantity. For example, if a trader selects quantities "1," "5," and "10," and the "Add" mode is selected, the selected values will be added to the total quantity of 16. It should be understood that different modes could be provided as well, such as a "Calculator" mode, or a "Replace" mode. If the "Calculator" mode is selected, the quantity pad will be treated as a calculator, so that when "1," "5," and "10" are selected, the quantity value will be set to 1510. Then, if the "Replace" mode is selected, the existing quantity will be replaced with the quantity corresponding to the newly selected button. For example, if "1," "5," and "10" are selected, the quantity value would be set to 10. It should be understood that a trader could set up quantity limits so that no matter what value is selected via the quantity pad, the order quantity will not be higher than the predefined maximum quantity value.

Referring back to the quantity pad 310, by selecting a "Clear" selection icon, the default quantity will be reset to 0. The default quantity in the icon 306 can be changed by setting a quantity via the quantity pad and then selecting a Default icon. A trader can also select an order type to be used in relation to any orders that are entered via the market grid 302. As shown at 312, a few example order type icons include a limit order "Limit" icon, a stop limit ("SL") icon, a stop market ("SM") icon, and a one cancels other ("OCO"). According to one example embodiment, a trader may assign different colors to each order type. In such an embodiment, when a trader selects different order types, a cursor being used in relation to the market grid 302 can change color to indicate which order type is currently activated. While only four order types are shown in FIG. 3, it should be understood that different order types could be used as well. When a trader selects the Limit icon, additional icons could be enabled to allow a trader to specify additional parameters to be used in relation to the limit orders. For example, two such parameters may include a time in force parameter that can be selected using an icon 318, and an order subtype that can be selected in relation to an icon 320.

The time in force parameter 318 can be used to allow a trader to designate a time period during which any limit order entered via the market grid 302 will be valid. As shown in relation to the icon 318, a default selection could be a good till day ("GTD") parameter, which sets the order life to the current trading session. Another example selection option could be good till cancel ("GTC"), which sets the order life until a trader cancels the order or until the tradeable object for which the order was submitted expires or gets filled. The order subtype icon 320 may allow a trader to designate if an order should be of a fill or kill ("FOK") type, or immediate or cancel ("IOC"). The FOK order requires that the full order quantity be filled completely and immediately. If it is not possible, the order is simply cancelled. With respect to the IOC order, the order requires that all or at least a portion of the quantity be filled immediately. If there is any remaining unfilled quantity, that quantity is simply cancelled. By default, the order subtype can be set to "None," as shown in FIG. 3, to indicate that neither "FOK" nor "IOC" will be used.

Referring back to the order type selection icons 312, if a trader selects the SL icon, any order submitted via the market grid 302 will be a stop limit order. When the SL is selected, a trailing stop ("Trailing") and a stop limit offset ("SLO") fields 316, as well as the time in force icon 318 can be enabled. The trailing stop field 316 allows a trader to designate that the stop order should trail with the market. According to one example embodiment, a trailing offset may be automatically set based on the number of ticks the stop order is placed away from the last traded price. In such an embodiment, if the stop order is moved, the trailing offset may be updated based on the new position of the stop order in relation to the last traded price. For example, if the last traded price moves down by 1 tick, a buy stop may then be moved down by 1 tick. It should be understood that a reference point, different than the last traded price, could be used as well. The SLO field can be used to define the number of ticks between the stop limit price and the stop entry price.

When the SM icon is selected, a trader may submit stop market orders. When the SM icon is selected, the trailing stop field 316 and the time force 318 can be activated as well. Finally, when the OCO icon is selected, a trader can submit two orders, and, when one of them gets filled, the other order will be cancelled. When the OCO icon is selected, the OCO SL, trailing stop, and SLO fields 316 will be activated as well. A trader can use the OCO SL to designate if the order should be an OCO stop limit or an OCO stop market order. If the checkbox displayed in relation to the OCO SL is not checked, an OCO stop market will be placed. An OCO order type can include either two stop orders, two limit orders, or a stop order and a limit order, and the OCO could be placed across two tradeable objects or a single tradeable object. According to one example, when a trader places individual orders for the OCO, a cursor may change its color so that a trader does not forget to place a second order for the OCO. For example, when a trader selects a first price level for the first order of the OCO, a cursor may change color to any user-defined color. Then, after a price is selected for the second order, the cursor may change to its original color, thus, providing to a trader a visual indication that the OCO was placed. It should be understood that when a trader places a first order for an OCO, the trader may break a link between the first order and any subsequently placed order by selecting a predetermined user selection input, such as an Esc button, for example.

In addition to order setting parameters, a trader could use one of the tabs 322 to automatically populate the market depth/order entry area 304 with a predetermined set of tradeable objects. The example groupings may be based on outright tradeable objects, adjacent spreads, packs and bundles ("Pcks, Bndl"), or yet some other miscellaneous, user-defined grouping.

The market depth/order entry grid 302 allows a trader to view and enter orders for multiple tradeable objects. While the market depth grid 302 displays market depth for each tradeable object horizontally, it should be understood that an alternative embodiment may include a vertical display, or yet a display with market depth being displayed at some angle. According to one example embodiment, the market depth for each tradeable object is displayed using a plurality of cells, with each cell defining a price and a quantity available at that price. For example, each cell may be associated with a predetermined statically assigned price so that the position of each cell does not change when, for example, the inside market changes. According to one example embodiment, when the market grid window is initially activated, an inside market corresponding to each tradeable object selected for display via the market grid 302 is preferably displayed in relation to one of the shown cells. Different methods for controlling how the market depth corresponding to each of the plurality of tradeable object is displayed in the market depth grid 302 will be described in greater detail below.

A trader could slide the viewable prices of all tradeable objects to the right or left using arrows 336 and 338. It should be understood that a trader could select which rows of prices to slide using the arrows. According to one example embodiment, a trader could slide the prices corresponding to all market depths displayed via the market grid 302 by selecting the arrows 336 and 338. Alternatively, a trader could select one or more market depths that the trader wishes to be moved upon using a shift key and the arrows 336 and 338.

Also, while the plurality of price axis shown in FIG. 3 are displayed such that prices corresponding to each tradeable object increase from left to right, it should be understood that a trader may wish to have one or more price axes inverted so that while prices for some tradeable objects increase from left to right, prices for other tradeable objects could increase from right to left.

The market grid 302 includes a column that defines a name of a tradeable object and/or the expiration date corresponding to that the tradeable object. In FIG. 3, the tradeable object is an example financial product future "GE" with four outright months being traded during a year. The outright months correspond to March, June, September, and December of the four consecutive years 2005, 2006, 2007, and 2008. According to one example embodiment, a trader can select a cell corresponding to the name of a tradeable object to activate a menu interface for that tradeable object. The menu interface can then enable a trader to activate a depth window, a formatting window, or a set up window, which could also be activated by selecting a setting control icon 324 described in greater detail below. The depth window, such as the MD Trader™ type market depth display referenced above, may allow a trader to view and place orders for a tradeable object. The formatting window can allow a trader to set up formatting and display related options, such as a background color for the selected tradeable object.

As mentioned earlier, the tradeable object column also includes the setting control icon, such as an icon 324, in relation to each name of the tradeable object. The setting control icon 324 can be used to activate a set-up window that can be used by a trader to define specific settings in relation to the respective tradeable object. When the setting control icon 324 is selected, another interface could be activated to enable a trader to define one or more parameters, such as one or more default order quantities, information displayed in each cell of the interface 300, such as the format of price levels to be displayed in each cell. For example, rather than displaying price levels, derivative of the price could be displayed as well. With respect to default quantities, a trader could define a right-click quantity or a left-click default quantity, an account, or a customer identifier to be used in relation to the tradeable object corresponding to the icon. It should be understood that default quantities can include a specific value or could be based on an Excel value being computed based on a formula. Also, the formula could be based on many different parameters, including a net position corresponding to a tradeable object, a trader's overall net position, a last fill for a tradeable object, a best bid/ask quantity, or yet some other parameters. If any specific settings are used for the tradeable object, such setting will override any default global settings. If a trader does not define any specific settings, global settings may be used in relation to a tradeable object. It should be understood that a single set-up window could be used to define settings for a plurality of tradeable objects. Alternatively, a single set up window could be activated to define specific setting for each tradeable object.

The market grid 302 displays market depth corresponding to each tradeable object listed in the tradeable object name column. FIG. 3 displays seven market depth levels in relation to each tradeable object; however, any number of the market depth levels could be displayed based on the user preferences. The market depth levels are displayed in cells including a price displayed on top of each cell and an available quantity displayed at the bottom of the cell. If there is no quantity corresponding to a price level in one of the cells, the quantity may be left blank, or zero could be displayed as well.

As mentioned earlier, according to one example embodiment, the prices displayed in relation to each cell are static so that, for example, when an inside market changes, the prices displayed in relation to each cell stay the same, and only indicators corresponding to the inside market may move to different cells. In the market grid 302, the inside market may be indicated by color-coding the cells corresponding to the prices/quantities of the inside market. Such two cells are shown in relation to the first tradeable object at 326 and 328, with the cell 326 corresponding to the best bid, and the cell 328 corresponding to the best ask. For example, a cell corresponding to the best bid could be color-coded blue, and a cell corresponding to the best ask could be color-coded red. Also, the cells corresponding to the best ask/bid could use a slightly larger font so that they could be easily distinguished from other cells. In one embodiment, if the best bid and/or best ask prices are at a lower/higher price than is currently visible for a tradeable object on the market grid 302, the last visible cell on the left/right side can be color-coded using any user-preferred color. Rather than color-coding the cells of interest, it should be understood that different methods could be used to inform a trader of relevant information. For example, graphical indicators could be used in relation to the cells.

Each cell displayed via the market grid includes quantities available for a tradeable object at a price level corresponding to each cell. According to one example embodiment, the quantities displayed in each cell can correspond to exchange-provided quantities. Alternatively, implied quantities could be displayed in addition to or instead of the exchange-provide quantities. For example, implied quantities could be combined with exchange-provided quantities. Alternatively, the implied quantities could be displayed in relation to the exchange-provided values.

It should be understood that additional indicators could be used in relation to the market grid cells to represent information other than that described above, and what is shown in the market grid 302 can be user configurable. For example, a trader may wish to view the high and low prices detected during a trading day in relation to a tradeable object. The highest and lowest prices can be shown using an indicator displayed in relation to a cell corresponding to that price. The indicator could be a color-coded line or any other user configured indicator.

The market grid 302 also includes a quantity status indicator 330 column that can provide an indication of whether the bid and ask quantities are going up or down. The quantity status could be represented using arrows, and the arrows could be color-coded to indicate a specific quantity behavior. It should be understood that the quantity status could be based on a specified number of market depth levels and could be updated at predefined time intervals. Also, different methods could be used to compare the quantities for the quantity status. According to one example embodiment, the trend indicators could be based on the current market data rather than last traded data, and could be generated, for example, by comparing bid quantities vs. ask quantities, determining, based on a number of price levels, if a bid quantity is higher than an ask quantity, or vice versa, and which accumulated quantity is higher. However, in another example embodiment, the combination of current market data and last traded data could be used to generate trend indicators. For example, a green arrow pointing up could be used to represent an upward movement of bid quantities and a downward movement of ask quantities. A red arrow pointing down could be used to represent a decline in bid quantities and an increase in ask quantities. Then, for example, if both bid and ask quantities are going down or up, a black arrow pointing down or up, respectively, could be used to show the quantity status.

The market grid 302 also displays a working order column 332 that can be used to show if there are any working orders corresponding to each of the plurality of tradeable objects. The working order column 332 may display a color-coded indicator at the level of each tradeable object. The indicator could be red if all working orders correspond to sells, or blue if all working orders correspond to buys. If working orders include buys and sells, the indicator could be black. It should be understood that different colors, or different indicator types could be used based on the user preferences.

Working order indicators could also be shown in relation to each working order price. According to one example embodiment, such indicators could be displayed in a cell corresponding to a price at which a working order is pending, such as an indicator 334 displayed in relation to a price level of 9851.0. The indicators could be color-coded. Based on the previously introduced color scheme, a red indicator could be used to indicate a working sell order, a blue indicator could be used to indicate a working buy order, and a black indicator could be used to indicate that a combination of a buy working order and a sell working order is pending at the corresponding price level. Then, if a working order corresponds to the best bid or ask price, a working order indicator could be white to stand out from the cell's background. If there are working buy and sell orders on either best bid price or best ask price, the indicator could be gray. Different colors or indicator types could be used as well.

In addition to order types described above, a trader could use the market grid 302 to enter a plurality of linked orders via a single selection of a price for a first order. A few example order types that may allow a trader to place linked orders are stairs, pyramids, ladders, dittos, and funnels. When one of such order types is activated, a trader could define how many orders should be placed in relation to each order type, and also a tick value between prices of two consecutive orders. Each order type can also be associated with quantity allocation rules that can be used to determine a quantity for each of the plurality of orders based on a quantity value specified for the first order. For example, the quantity allocation rules could take a format of a multiplier defined for each of the plurality of orders. To illustrate the process of submitting a stair order type, let's assume that four orders were defined in relation to the stair order type, the quantity allocation rules define a plurality of multipliers 1, 2, 3, and 4, and no tick gaps were defined in relation to the plurality orders. Applying this example in relation to the market depth of GE Mar05 in the market depth grid 302, if a quantity of 10 is a default quantity, and a trader selects the best bid price to place a buy order, a first buy order for a quantity of 10 will be submitted at a price of 9852.0. Then, based on the rules above, three other orders having order quantities of 20, 30, and 40, will be automatically placed at prices 9851.5, 9851.0, and 9850.5, respectively. It should be understood that the quantity allocation rules and price gaps could be user configurable. As an example, assuming that four orders will be placed in relation to each order type, a pyramid quantity allocation rules could be set to 1, 2, 4, and 8, a ladder quantity allocation rules could be set to 1, 1, 1, and 1, and a funnel quantity allocation rules could be set to 4, 3, 2, and 1. If an exchange imposes a maximum order quantity, and a trader desires to place a larger quantity order, a trader could submit a ditto order that effectively breaks the trader's order quantity into a number of orders, and the sum of the orders' quantities is the desired order quantity.

When one of such order types is placed via the market grid 302, they can be distinguished from other working orders with a color or yet some other indicator denoting that the orders are linked. A trader can then drag-and-drop a linked order group to a different price level. In such an embodiment, rather then canceling all orders and placing a new set of linked orders, some order quantities can be deleted, or additional orders could be submitted to increase a quantity value at one or more price levels. As an example, let's assume that the following working orders form a pyramid order: 10@114.97, 20@114.96, 40@114.95, 80@114.94, and 160@114.93. Let's now assume that a trader wishes to move the pyramid order one tick up. Rather than deleting all orders and submitting a new set of orders, the following actions could be performed to process the request: Add 10@114.98, Add 10@114.97, Add 20@114.96, Add 40@114.95, Add 80@114.94, and Delete 160@114.93. Now, assuming that a trader wishes to drop the linked orders by two ticks, the following actions could be performed to process the request: Delete 10@114.98, Delete both 10@114.97, Delete last 20@114.96, Change original 20@114.96 to 10@114.96, Delete last 40@114.95, Change original 40@114.95 to 20@114.95, Delete last 80@114.94, Change original 80@114.94 to 40@114.94, Add 80@114.93, and Add 160@114.92. It should be understood that while the examples given above were given in relation to a single tradeable object, the linked orders could be placed across a plurality of tradeable objects as well and could be moved to a different plurality of tradeable objects.

Referring now to the order related data area 304, a trader can view more detailed data corresponding to working orders, trader's data, and market data. The order related data area 304 includes a working order quantity ("Orders") column, a net position ("NP") column, a last traded price ("LTP") column, and a last traded quantity ("LTQ") column. The "Orders" column displays a quantity corresponding to working orders corresponding to a tradeable object. The displayed quantity value could be color-coded to reflect if the quantity corresponds to a buy quantity or a sell quantity. If there are buy and sell quantities pending at a price, the quantities can be displayed in a format "B×S," with "B" corresponding to a quantity of pending buy working orders, and "S" corresponding to a quantity of pending sell working orders. The top row of the "Orders" column displays a total quantity corresponding to all working orders. In the example embodiment illustrated in FIG. 3, the total quantity is "260×422," which corresponds to the working bid quantity of 260 and the working ask quantity of 422.

The net position column displays net position being held by a trader in relation to each tradeable object. The last traded price column indicates the last traded price of the tradeable object, and the last traded quantity displays the last traded quantity. It should be understood that different or additional information could be displayed in the order related data area 304, and the displayed parameters are only examples.

In addition to providing market information, the market grid 302 could also be used for order entry. It should be understood that different methods could be used for order entry, and the example embodiments are not limited to the order activation actions that will be described below. According to one example embodiment, if a trader uses a mouse as an input device, different default quantities could be assigned to the right-click input and the left-click input. Also, the position of the mouse within a market grid cell may be used to determine if an order being placed is a buy order or a sell order. According to one example embodiment, when a trader positions a mouse over a market grid cell, two sub-cells can be activated: the first sub-cell including a price, and the second one including a quantity available at that price. Also, the currently selected sub-cell could be highlighted. In such an embodiment, a buy order or a sell order can be placed for a tradeable object based on whether a trader selects a quantity sub-cell or a price sub-cell. For example, selecting a price sub-cell can activate a sell order, and selecting a quantity sub-cell can activate a buy order.

Based on the order configuration described above, left-clicking on a price sub-cell may trigger a sell order having an order quantity predefined for the left-click, and right-clicking on the price sub-cell may trigger a sell order having an order quantity associated with the right-click. Then, when a trader selects a quantity sub-cell, a buy order can be triggered, and the order quantity may depend on whether the trader selected the quantity sub-cell using a right-click or a left-click. It should be understood that right- and left-click quantities could be the same or different than a global quantity or a tradeable object specific default quantity. If the "Sweep Qty" icon 308 is selected when the orders are placed, the quantity may be swept starting from the quantity corresponding to the selected cell.

Figure 4:
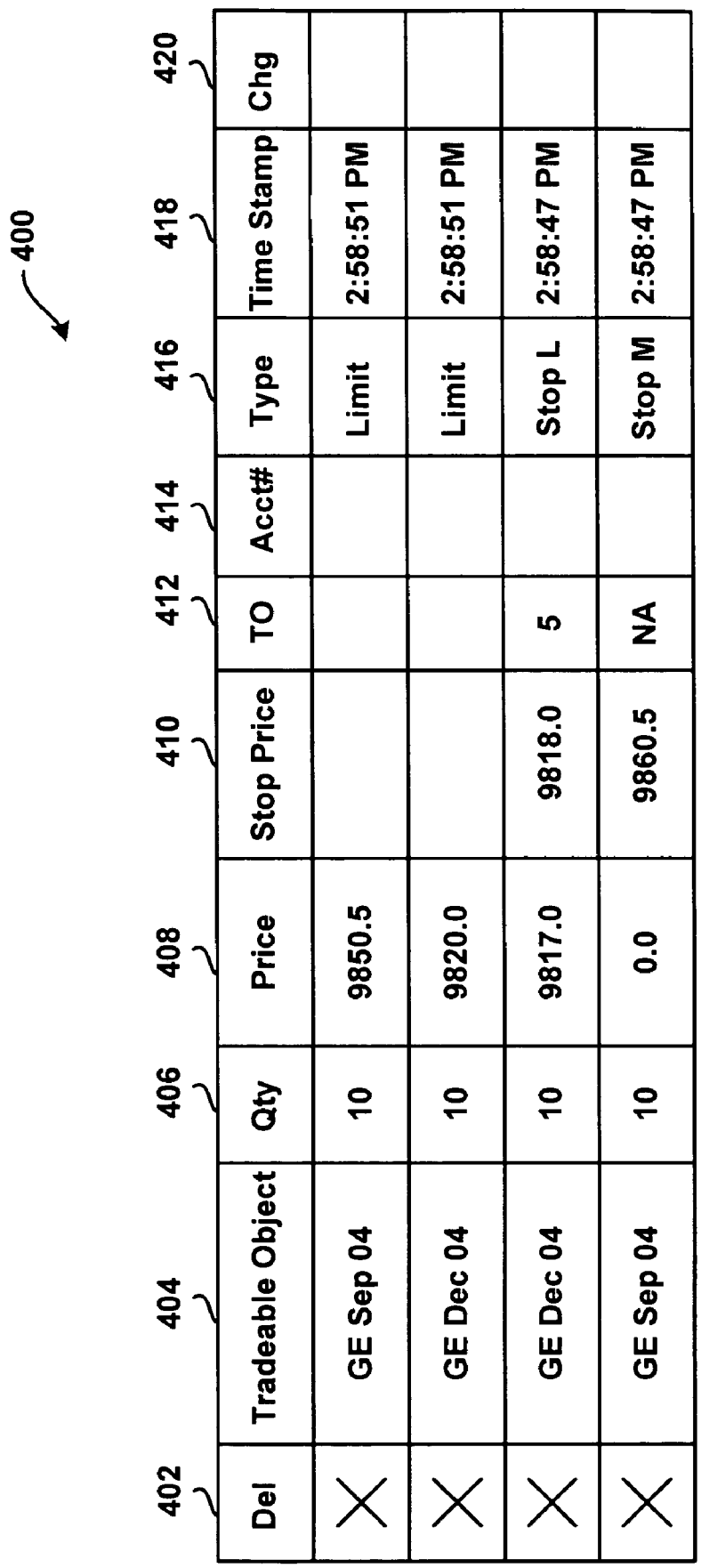
FIG. 4 is a block diagram illustrating an example order pane for displaying information related to a plurality of working orders.

While a trader can view all working orders corresponding to the price levels displayed via the market depth grid 302, the trader may wish to view additional details corresponding to the working order indicators, or yet see if there are any other working orders pending at the price levels that are not currently visible via the market depth grid 302. According to one example embodiment, a trader can view such details via an order pane window. An example order pane window 400 is shown in FIG. 4. The order pane window including information on working orders corresponding to a tradeable object could be automatically activated by positioning a user input device, such as a mouse, for a predetermined period of time, in relation to one of the market depth cells corresponding to a tradeable object. Alternatively, a user could right-click or left-click in the "Orders" column in the region 304. For example, when the order pane is activated using the cell corresponding to the total working order quantity, here the cell with "260×422," the order pane can display information corresponding to working orders of a plurality of tradeable objects associated with the working orders. Different activation methods could also be used. The order pane window 400 could include working order information corresponding to the selected tradeable object or a plurality of tradeable objects. If two or more working orders are linked, such as, if they are part of an OCO, at least a portion of a row corresponding to each order could be highlighted. Alternatively, different identifiers could be used to show the relationship between the orders.

The order pane 400 includes a plurality of fields: a delete "Del" field 402, a "Tradeable Object" field 404, a quantity ("Qty") field 406, a "Price" field 408, "Stop Price" field 410, a trailing offset ("TO") field 412, an account number ("Acct") field 414, a "Type" field 416, a "Time Stamp" field 418, and a Change ("Chg") field 420.

A trader can use the order pane window 400 to change order parameters corresponding to the displayed working orders. To change the order quantity and/or price, a trader could either type a desired value in the price or quantity column 408 and 406, or right/left click on the displayed values to increase/decrease the values by a certain value. The "Stop Price" column 410 and the "TO" column 412 can be displayed if one of the working orders is a stop order. The stop price and the trailing offset could be modified by right/left clicking on the value to increase/decrease the price and offset, respectively. When any change is made, an "OK" icon can appear in the "Chg" field 420, and a trader could select the "OK" icon to accept the changes.

The "Type" column 418 indicates an order type corresponding to each working order. Based on the system configuration, the "Time Stamp" 418 may indicate when an order was sent to or received at an exchange. The "Acct#" column 414 indicates which trader's account is used to trade the respective tradeable object.

Referring back to FIG. 3, a trader could also modify order parameters using the market depth grid 302. For example, a trader can move the working order indicators within the corresponding market depth. In such an embodiment, when a trader moves a working order indicator from a first cell corresponding to a first price level of a tradeable object to a second cell corresponding to a second price level of the tradeable object, the working order at the first price level can be canceled, and a message to place another order at the second price could be send to an electronic exchange. According to one example embodiment, a right click on a working order indicator, and then dragging and dropping that indicator to another location within the market grid may initiate the process of canceling the existing working order and placing another order at the selected price. In addition to changing the price of the order within a market depth of the same tradeable object, the same functionality can be applied across a plurality of tradeable objects being shown via the market depth grid 302. In such an embodiment, rather than moving a working order indicator within an area corresponding to market depth of a single tradeable object, a trader could move an indicator to one of the cells corresponding to market depth of a different tradeable object. It should be understood that the quantity corresponding to the moved working order could stay the same or could change based on user settings. Also, a trader could delete an order by moving a working order icon out of the market depth grid 302.

Rather than deleting each working order individually, a trader could delete all working orders corresponding to a tradeable object via a single action of a user input device. The single action can include a user left-clicking a cell in the "Orders" column of the order related data area 304, with the selected cell corresponding to a tradeable object for which a trader wishes to delete all working orders. Using such a method, a trader could delete working orders corresponding to all tradeable objects by selecting a cell that displays a sum of all working order quantities.

It should be understood that the indicators described in relation to the interface of FIG. 3 are only examples, and additional or different data could be provided as well. For example, the interface could include additional selection icons, such as delete all orders at the inside market prices, or yet some other selection icons. Also, it should be understood that a trader could resize the cells or the entire interface based on his preferences. Also, a trader could hide some columns, such as the columns in the order related data area 304.

According to an example embodiment, market depth(s) displayed in the market grid 302 can be repositioned upon detecting a preset user action or detecting selection of one or more icons. It should be understood that a trader could designate any item of interest as the basis for repositioning the market depth, such that, upon repositioning, the item of interest in the market depth will be moved to a predetermined location within a display area of the market depth. The item of interest could be user configurable and can include a value corresponding to a predetermined parameter or a formula. For example, the item of interest could be the inside market, the last traded price, or a theoretical value computed based on a user-defined formula. Also, for example, if a plurality of tradeable objects includes a plurality of financial products, such as STIRs, the item of interest could take a format of a yield curve or yet some other curve determined based on a function or a formula that is used to predict theoretical movements of the markets corresponding to a group of tradeable objects.

According to an example embodiment, a trader may designate any item of interest to be the basis for the positioning function, such that, upon repositioning, the item of interest(s) corresponding to one or more market depth(s) displayed via the market depth grid 302 may be moved to a predetermined location on the display. The process of repositioning can include re-centering. However, it should be understood that the predetermined location could be any location within an area corresponding to each market depth.

Also, rather than activating the process of repositioning upon detecting a user input, the process could be activated automatically. For example, automatic repositioning could be triggered either by a timer, or by monitoring movement of any item of interest about the display. For example, in relation to the market depth grid 302, a trader could select one or more inside market(s) to be the items of interest. Then, for example, if the items of interests are outside of the viewable area, the market depth corresponding to a tradeable object associated with the item of interest can be repositioned based on the predefined settings. However, it should be understood that more than one market depth corresponding to multiple tradeable objects could be repositioned based on a single item of interest, such as an inside market corresponding to one tradeable object.

As mentioned earlier, the process of repositioning can be applied globally to all market depths displayed in relation to the market depth grid, or a trader could link or group the market depths. According to one example embodiment, a dialog box or a menu item could be used to enable the user to group or link market depths corresponding to multiple tradeable objects for the purpose of repositioning. For example, a trader could designate one tradeable object as a master, and market depth corresponding to other tradeable objects linked to the master could be repositioned whenever the master market depth is repositioned. It should be understood that a trader could have one or more market depths displayed via the market depth grid 302 ignore the re-positioning.

Figure 5:
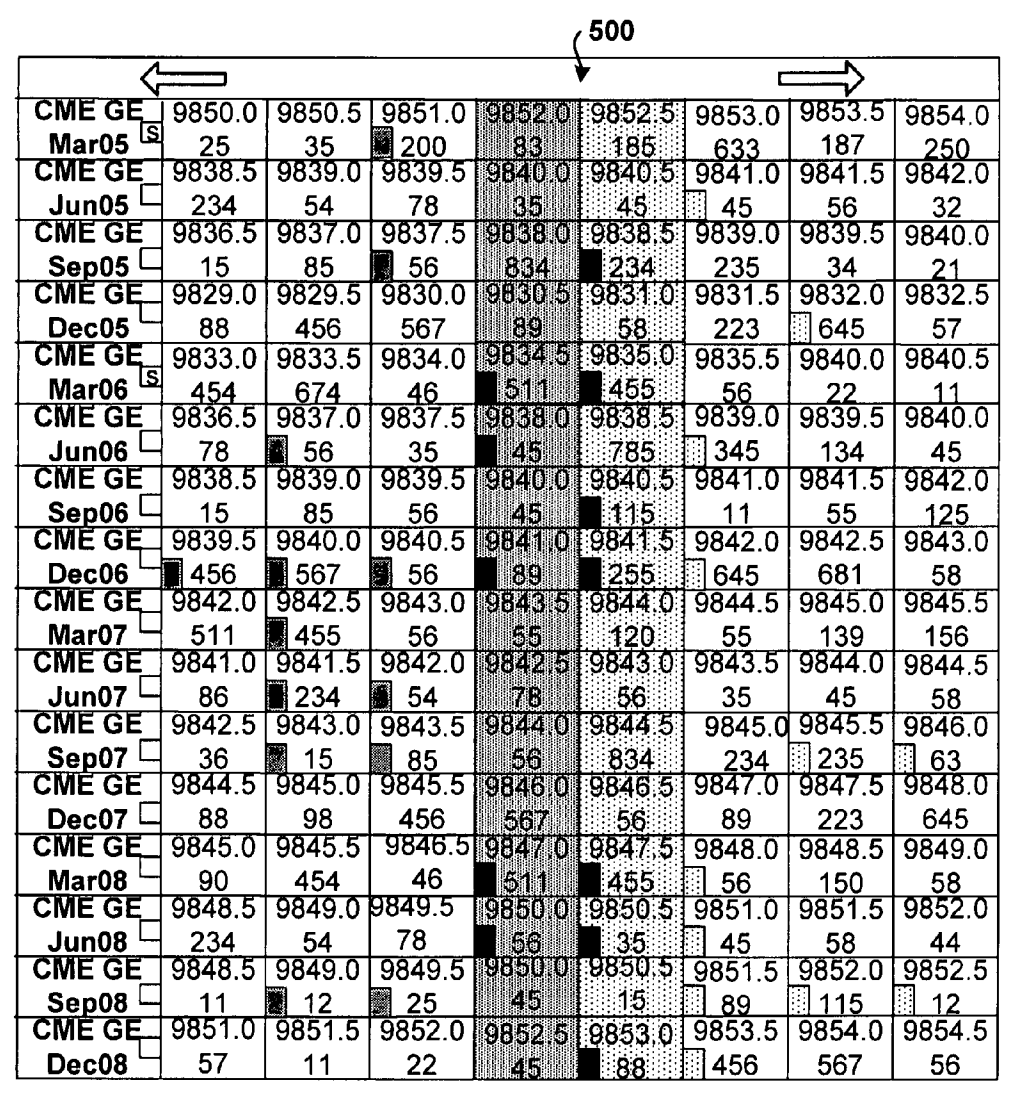

FIG. 5 is a block diagram illustrating a market depth grid 500 corresponding to a repositioned market depth grid of FIG. 3. In FIG. 5, a designated item of interest for each market depth is set to an inside market, and the market depths are re-centered on the inside market cells corresponding to each tradeable object.

As mentioned earlier, theoretical functions could be used to define a theoretical relationship between two or more related tradeable objects. The theoretical relationship could take the format of a graph, such as a curve or a line that could be displayed in relation to the market depths of a plurality of tradeable objects. According to one example embodiment, the items of interest corresponding to a plurality of tradeable objects, such as inside markets, could then be re-centered around a graph defining the theoretical relationship between the tradeable objects. FIG. 6 is a block diagram illustrating a market depth grid 600 corresponding to a repositioned market depth grid of FIG. 3. In FIG. 6, a designated item of interest for market depth is set to an inside market, and the inside markets are re-centered around a yield curve 602 defining a theoretical relationship between the tradeable objects. FIG. 6 illustrates a plurality of markets depths centered around the yield curve, however, as the time goes by, the market depth can move, so that the inside market will not be perfectly centered on the yield curve. For example, when an inside market corresponding to a tradeable object is at a price higher than that suggested by a yield curve, a trader may treat that as an indicator of a good time to sell, since the underlying assumption would be that the inside market would come back to the price of the yield curve. Similarly, when the inside market price is lower than the price associated with the yield curve, the trader may treat that situation as a good time to buy.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for trading multiple tradeable objects in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for displaying market information of a tradeable object comprising:

displaying, in a first screen region of a graphical user interface on a display of a computing device, a portion of a first value axis for a first tradeable object, the first value axis having a first plurality of locations, each of the first plurality of locations corresponding to a value for buy orders and sell orders for the first tradeable object;

dynamically displaying an indicator relating to an inside market of the first tradeable object in one of the first plurality of locations in the first screen region, the indicator in the first screen region being displayed in relation to the portion of the first value axis and the inside market of the first tradeable object having a highest bid price for the first tradeable object and a lowest ask price for the first tradeable object;

displaying, in a second screen region of the graphical user interface, a portion of a second value axis for a second tradeable object, the second value axis being non-collinear with the first value axis and having a second plurality of locations, each of the second plurality of locations being different than the first plurality of locations and corresponding to a value for buy orders and sell orders for the second tradeable object wherein the second screen region is displayed in relation to the first screen region;

dynamically displaying an indicator relating to an inside market of the second tradeable object in one of the second plurality of locations in the second screen region, the indicator in the second screen region being displayed in relation to the portion of the second value axis, the inside market of the second tradeable object having a highest bid price for the second tradeable object and a lowest ask price for the second tradeable object and the second tradeable object being different than the first tradeable object;

receiving a repositioning command via a user input device associated with the computing device;

in response to the repositioning command, repositioning the first value axis, where the indicator relating to the inside market of the first tradeable object is displayed at a new location in the first screen region determined according to an algorithm for repositioning movement of the first axis; and in response to repositioning the first value axis, repositioning the second value axis, where the indicator relating to the inside market of the second tradeable object is displayed at a new location in the second screen region determined according to an algorithm for a repositioning relationship between the first value axis and the second value axis, the repositioning relationship defining changes in position of the second value axis relative to changes in position of the first value axis.

2. The method of claim 1, wherein the indicator relating to the inside market of the first tradeable object is associated with a best bid or a best ask of the first tradeable object, and wherein the indicator relating to the inside market of the second tradeable object is associated with a best bid or a best ask of the second tradeable object.

3. The method of claim 1, wherein the indicator relating to the inside market of the first tradeable object is associated with a last traded price of the first tradeable object, and the indicator relating to the inside market of the second tradeable object is associated with a last traded price of the second tradeable object.

4. The method of claim 1, wherein the first value axis comprises a first price-based value axis, and wherein a second price-based value axis comprises a second price-based value axis.

5. The method of claim 1, wherein the first value axis and the second value axis are static value axis.

6. The method of claim 1, wherein the new location in the first screen region and the new location in the second screen region are based on a curve.

7. The method of claim 6, wherein the curve comprises a yield curve.

8. The method of claim 1, wherein the new location in the first screen region is approximately in the center of the first screen region and the new location in the second screen region is approximately in the center of the second screen region.

9. The method of claim 1, further comprising:
selecting with a user input device a location of the first plurality of locations in the first screen region to initiate placement of a trade order to buy or sell the first tradeable object; and
displaying a first working order indicator in the selected location of the first screen region.

10. The method of claim 9, further comprising:
moving the first working order indicator from the location in the first screen region to a location in the second screen region, wherein movement of the first working order indicator to the second screen region initiates placement of a trade order to buy or sell the second tradeable object, and wherein an order quantity of the trade order associated with the second tradeable object is determined based on a predefined algorithm; and
displaying a working order indicator at the location in the second screen region.

11. The method of claim 10, further comprising:
selecting with a user input device a location of the second plurality of locations in the second screen region to initiate placement of a trade order to buy or sell the second tradeable object; and
displaying a second working order indicator in the selected location of the second screen region.

12. The method of claim 11, further comprising:
linking the first order indicator with the second order indicator to create a linked order; and
initiating movement of the linked order to another location using at least the first order indicator and the second order indicator, wherein the movement of the linked order causes a change in at least one order parameter.

13. The method of claim 12, wherein the linked order can be moved to a different screen region associated with at least one tradeable object different than the first tradeable object or the second tradable object.

14. The method of claim 1, further comprising:
selecting with the user input device a location of the first plurality of locations in the first screen region to initiate placement of a first order to buy or sell the first tradeable object and the second tradeable object.

15. The method of claim 1, wherein the graphical user interface comprises one or more windows.

16. A computer readable medium containing program instructions for causing a microprocessor to execute a method for displaying market information of a tradeable object, comprising:
displaying, in a first screen region of a graphical user interface on a display of a computing device having the microprocessor, a portion of a first value axis for a tradeable object, the first value axis having a first plurality of locations, each of the first plurality of locations corresponding to a value for buy and sell orders for the first tradeable object;
dynamically displaying an indicator relating to an inside market of the first tradeable object in one of the first plurality of locations in the first screen region, the indicator in the first screen region being displayed in relation to the portion of the first value axis and the inside market of the first tradeable object having a highest bid price for the first tradeable object and a lowest ask price for the first tradeable object;
displaying, in a second screen region of the graphical user interface, a portion of a second value axis for a second tradeable object, the second value axis being non-collinear with the first value axis and having a second plurality of locations, each of the second plurality of locations being different than the first plurality of locations and corresponding to a value for buy orders and sell orders for the second tradeable object wherein the second screen region is displayed in relation to the first screen region;
dynamically displaying an indicator relating to an inside market of the second tradeable object in one of the second plurality of locations in the second screen region, the indicator in the second screen region being displayed in relation to the portion of the second value axis, the inside market of the second tradeable object having a highest bid price for the second tradeable object and a lowest ask price for the second tradeable object and the second tradeable object being different than the first tradeable object;
receiving a repositioning command via a user input device associated with the computing device;
in response to the repositioning command, repositioning the first value axis, where the indicator relating to the inside market of the first tradeable object is displayed at a new location in the first screen region determined according to an algorithm for repositioning movement of the first axis; and
in response to repositioning the first value axis, repositioning the second value axis, where the indicator relating to the inside market of the second tradeable object is displayed at a new location in the second screen region determined according to an algorithm for a repositioning relationship between the first value axis and the second value axis, the repositioning relationship defining changes in position of the second value axis relative to changes in position of the first value axis.

17. A display apparatus, comprising:
a graphical user interface on a computer comprising two or more screen regions displayed in relation to each other;
a first screen region having a portion of a first value axis for a first tradeable object, the first value axis having a first plurality of locations, wherein each location of the first plurality of locations corresponds to a value for buy orders and sell orders for the first tradeable object;
a first indicator displayed in one of the first plurality of locations in the first screen region in relation to the portion of the first value axis, the first indicator associated with an inside market of the first tradeable object, the inside market of the first tradeable object having a highest bid price for the first tradeable object and a lowest ask price for the first tradeable object;
a second screen region having a portion of a second value axis for a second tradeable object being non-collinear with the first value axis, the second value axis having a second plurality of locations being different that the first plurality of locations, and wherein each location of the second plurality of locations corresponds to a value for buy orders and sell orders for the second tradeable object; and
a second indicator displayed in one of the second plurality of locations in the second screen region in relation to the portion of the second value axis, the second indicator associated with an inside market of the second tradeable object, the inside market of the second tradeable object having a highest bid price for the second tradable object and a lowest ask price for the second tradeable object, the second tradeable object being different than the first tradeable object, where in response to a repositioning command based on an algorithm, the graphical interface includes a repositioned first value axis where the first indicator is displayed in a new first location in the first screen region determined according to an algorithm for repositioning movement of the first axis, and a repositioned second value axis where the second indicator is displayed in a new second location in the second screen region determined according to an algorithm for a repositioning relationship between the first value axis and the second value axis, the repositioning relationship defining changes in position of the second value axis relative to changes in position of the first value axis.

18. The display apparatus of claim 17, wherein the indicator relating to the inside market of the first tradeable object is associated with a best bid or a best ask of the first tradeable object, and wherein the indicator relating to the inside market of the second tradeable object is associated with a best bid or a best ask of the second tradeable object.

19. The display apparatus of claim 17, wherein the indicator relating to the inside market of the first tradeable object is associated with a last traded price of the first tradeable object, and the indicator relating to the inside market of the second tradeable object is associated with a last traded price of the second tradeable object.

20. The display apparatus of claim 17, wherein the first value axis comprises a first price-based value axis, and wherein the second value axis comprises a second price-based value axis.

21. The display apparatus of claim 20, wherein the first price-based value axis and the second price-based value axis comprise static value axis.

22. The display apparatus of claim 17, wherein the new location in the first screen region and the new location in the second screen region are based on a curve.

23. The display apparatus of claim 17, further comprising:
a user input device for selecting a location of the first plurality of locations in the first screen region to initiate placement of a trade order to buy or sell the first tradeable object; and
a first working order indicator displayed in the selected location of the first screen region.

24. The display apparatus of claim 23, further comprising:
a second working order indicator displayed at a location in the second screen region upon detecting a movement of the first working order indicator from the selected location in the first screen region to the location in the second screen region, the second working order indicator associated with a trade order to buy or sell the second tradeable object, wherein an order quantity of the trade order associated with the second working order indicator is determined based on a predefined algorithm.

25. The display apparatus of claim 23, further comprising:
a second working order indicator in a location in the second screen region, the second working order indicator corresponding to a trade order to buy or sell the second tradeable object; and
a linked working order indicator corresponding to a linked order comprising the trade order corresponding to the first tradeable object and the trade order corresponding to the second tradeable object, wherein the linked working order indicator can be moved to another location, and wherein the movement of the linked order indicator causes a change in at least one order parameter.

* * * * *